G. L. HARRIS.
AUTOMOBILE SIGNAL.
APPLICATION FILED AUG. 30, 1916.
1,251,517.
Patented Jan. 1, 1918.
5 SHEETS—SHEET 1.
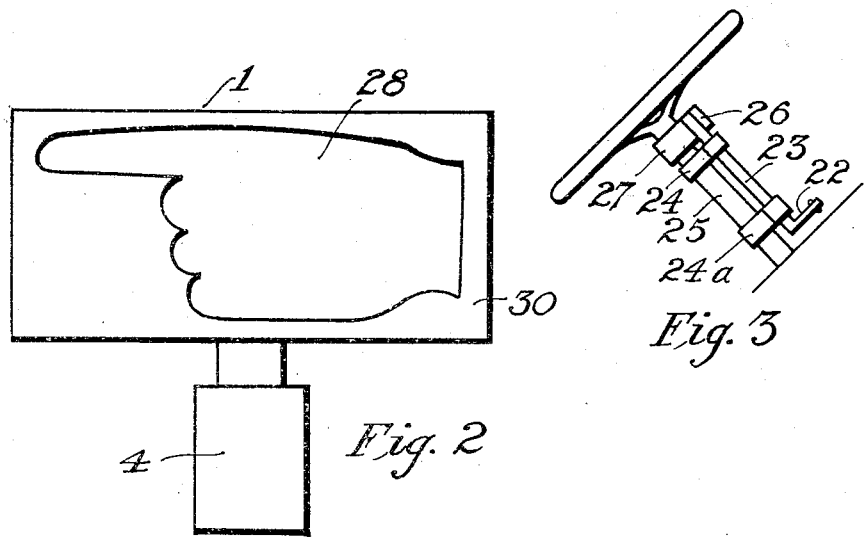
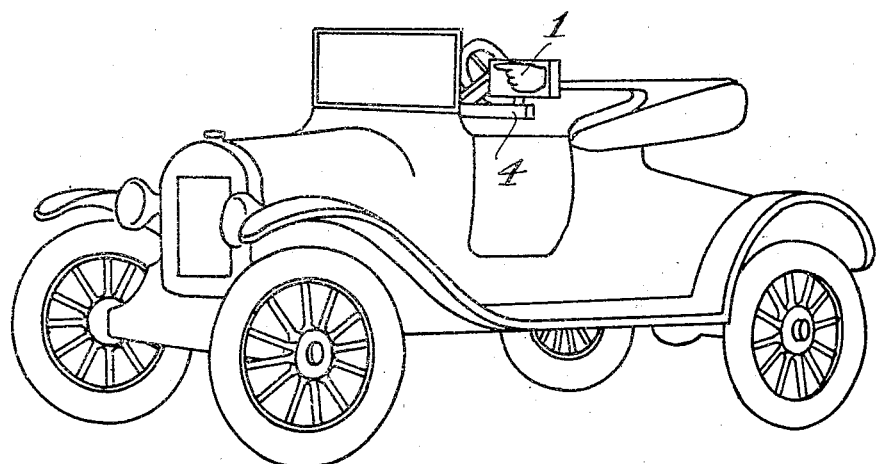

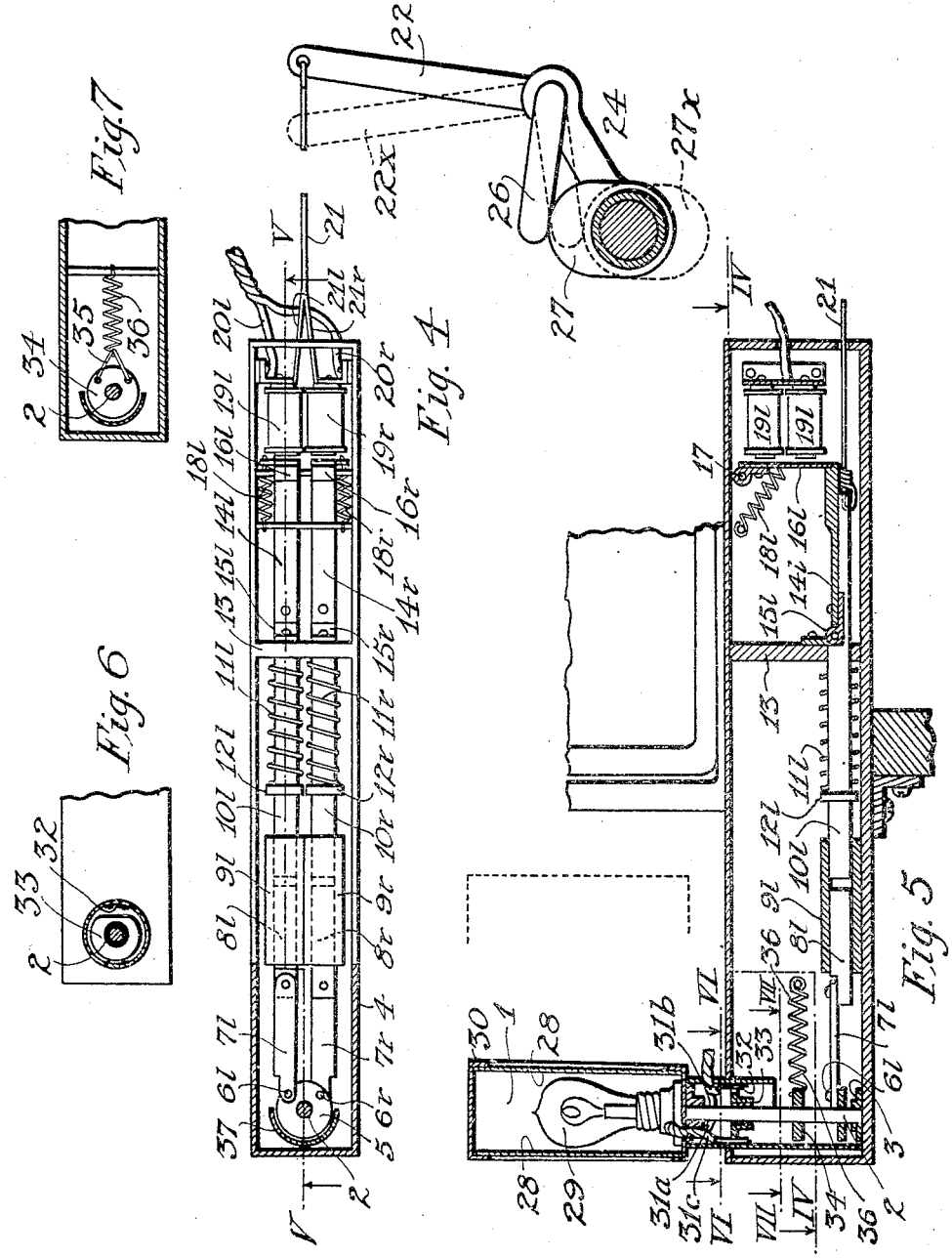

G. L. HARRIS.
AUTOMOBILE SIGNAL.
APPLICATION FILED AUG. 30, 1916.
1,251,517.
Patented Jan. 1, 1918.
5 SHEETS—SHEET 3.
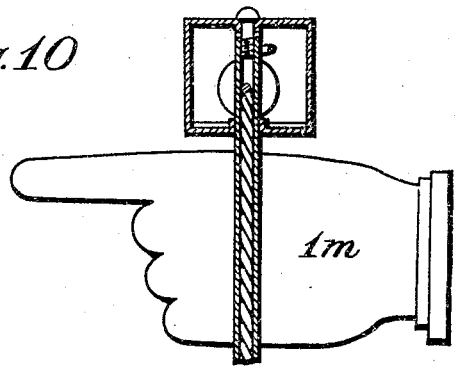
Fig. 10
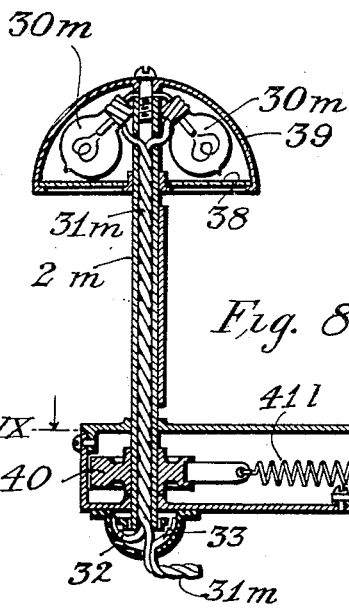
Fig. 8
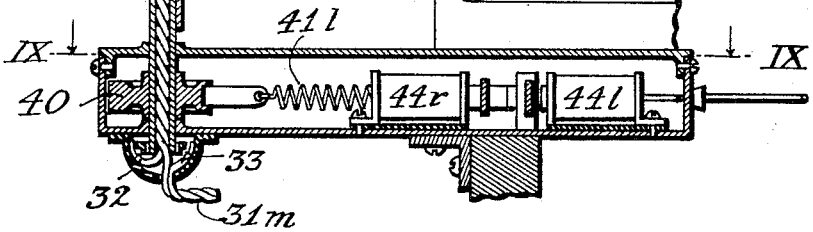
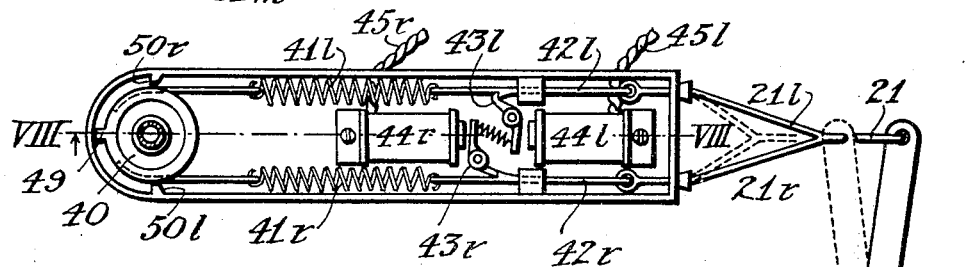
Fig. 9
Witnesses
D. C. Miller
A. H. Payne
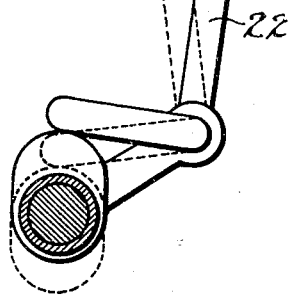
Inventor
George L. Harris
by Joseph H. Weatherford
Attorney

G. L. HARRIS.
AUTOMOBILE SIGNAL.
APPLICATION FILED AUG. 30, 1916.

1,251,517.

Patented Jan. 1, 1918.
5 SHEETS—SHEET 4.

Witnesses
D. C. Miller
A. H. Payne

Inventor
George L. Harris
by Joseph H. Weatherford
Attorney

G. L. HARRIS.
AUTOMOBILE SIGNAL.
APPLICATION FILED AUG. 30, 1916.
1,251,517.
Patented Jan. 1, 1918.
5 SHEETS—SHEET 5.
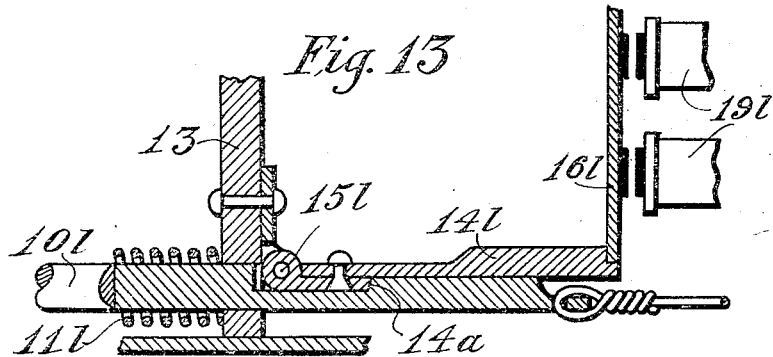
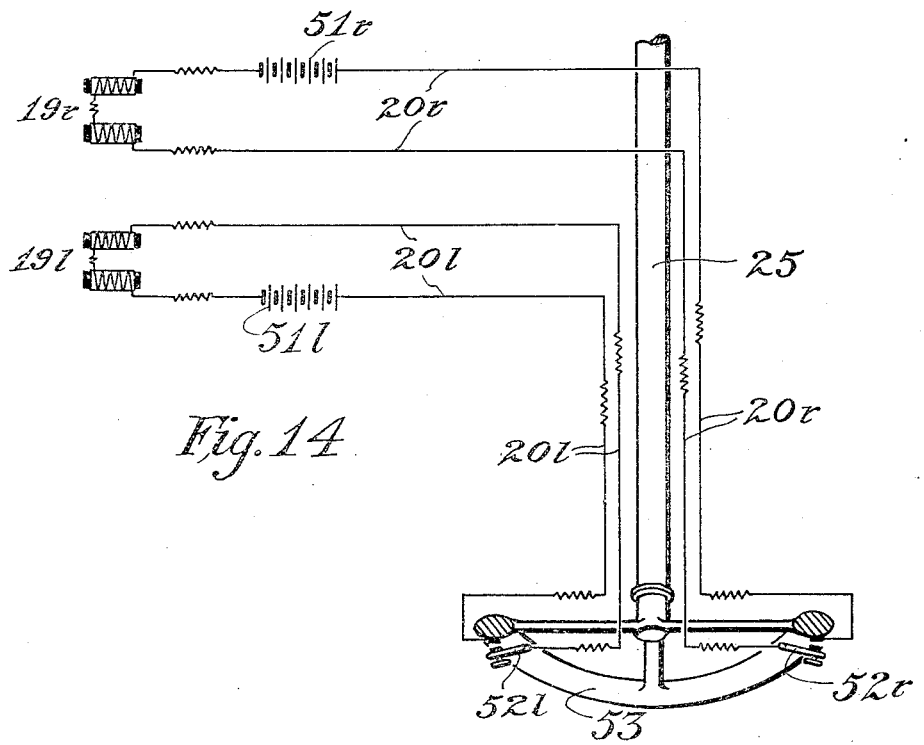
WITNESSES:
A H Payne
D. C. Miller
INVENTOR
George L. Harris
BY
Joseph H Weatherford
ATTORNEY

UNITED STATES PATENT OFFICE.

GEORGE L. HARRIS, OF MEMPHIS, TENNESSEE.

AUTOMOBILE-SIGNAL.

1,251,517.	Specification of Letters Patent.	Patented Jan. 1, 1918.

Application filed August 30, 1916. Serial No. 117,583.

*To all whom it may concern:*

Be it known that I, GEORGE L. HARRIS, of Memphis, in the county of Shelby and State of Tennessee, have invented certain new and useful Improvements in Automobile-Signals, of which the following is a full, clear, and exact description, such as will enable any one skilled in the art to make and use same.

The objects of my invention are, first to make an automobile signal which will indicate clearly to both approaching and following vehicles, or pedestrians, the direction in which it is the intention of the chauffeur to turn the machine out of its line of travel, and second, to make such a device which will operate with a minimum effort on the part of the chauffeur, and which will automatically restore itself to a normal position when the turn is made. I accomplish these objects as will be more fully hereinafter set out in the drawings, specification and claims.

In the drawings:—

Figure 1 is a perspective view of an automobile showing the warning signal set to indicate a turn to the right.

Fig. 2 is an enlarged view of the signal shown in Fig. 1.

Fig. 3 is an enlarged detail of the steering wheel showing the automatic resetting device.

Fig. 4 is a section on the line IV—IV of Fig. 5 looking down and showing the operating device for setting, tripping and oscillating the signal hand.

Fig. 5 is a sectional elevation on the line V—V of Fig. 4 showing the same mechanism and a cross section of the signal hand.

Fig. 6 is a section on the line VI—VI of Fig. 5, showing a detail.

Fig. 7 is a section on the line VII—VII of Fig. 5, showing a detail.

Fig. 8 is a sectional elevation on the line VIII—VIII of Fig. 9, showing a modified form of operating device for tripping and oscillating the signal hand and a modified form of hand.

Fig. 9 is a section on the line LX—LX of Fig. 8, showing the same mechanism.

Fig. 10 is a section on the line X, showing the modified signal hand.

Fig. 13 is an enlarged fragmentary section on the line V—V of Fig. 4 showing detail of the latches for holding the plunger rods retracted.

Fig. 14 is a diagrammatic view showing the wiring circuits.

Figure 11:
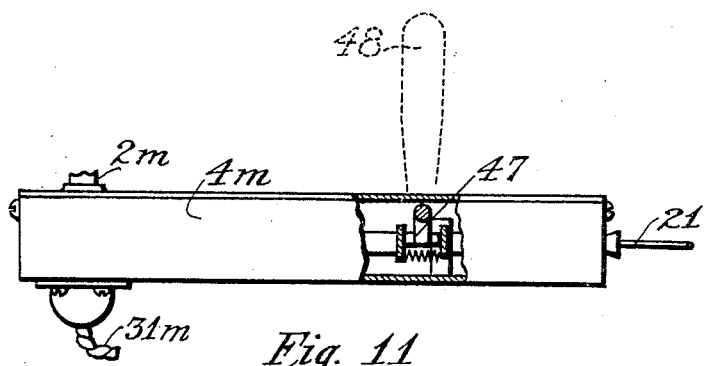
Fig. 11 is a side elevation partially sectional to show a detail of a modified form of tripping device.

Referring now to the drawings, in which the various parts are indicated by numerals, 1 is a signal hand, mounted on and fastened to a post 2 which turns in bearings 3. These bearings are a part of a case or box 4, which case serves to inclose the rotating and tripping mechanism, and is attached to the side of the automobile body just below the bottom of the windshield, preferably in such manner as not to interfere with the raising or lowering of same. This mechanism consists of an oscillating member, or disk 5, with wrist pins $6^r$, $6^1$, connecting rods $7^r$, $7^1$, and guide rods $8^r$, $8^1$, slidably mounted in guides $9^r$ $9^1$, respectively. $10^r$, $10^1$ are plungers actuated by compression springs $11^r$, $11^1$, working against collars $12^r$, $12^1$, and the cross member 13 of the case 4. The plungers $10^r$, $10^1$, are held retracted as shown with the springs $11^r$, $11^1$, compressed, by latches $14^r$, $14^1$ which engage corresponding shoulders $14^a$ (Fig. 13) formed in said plungers. The latches $14^r$, $14^1$, are hinged on pins $15^r$, $15^1$ and are in turn locked by auxiliary latches $16^r$, $16^1$, pivoted on a rod 17, and held in place by the springs $18^r$, $18^1$. $19^r$, $19^1$, are electromagnets which are connected by a pair of wires $20^r$, $20^1$, respectively, to batteries $51^r$ and $51^1$ (Fig. 14), and which terminate at switches $52^r$ and $52^1$, or other suitable form of circuit closing devices, on the steering wheel 53 of the automobile. The wires $20^r$ terminate in the switch $52^r$ on the right hand side of the steering wheel and the wires $20^1$, in the switch $52^1$ on the left hand side as the wheel normally stands when the car is running straight ahead, none of which is shown. $21^r$, $21^1$, are cords which extend from the two plungers $10^r$, $10^1$, out through the end of the case 4, and are preferably joined together and carried as a single cord 21 to a bell crank lever system, comprising a lever arm 22, fastened on the lower end of a rod 23 (Fig. 3) which extends downward along the steering post from a point just below the steering wheel to a point in line with the case 4. This rod 23 is carried by and is free to rotate in brackets 24, $24^a$ fastened on the steering post 25, and at its upper end carries a second lever arm 26, which is adapted to rest against a cam 27, which is fastened to the hub of the steering wheel.

The signal hand 1 consists essentially of two transparent signal hands 28, spaced apart and having a light, 29, between them to provide a signal at night. These transparent signal hands are preferably of glass and since such material is fragile and not easy to shape, I prefer to use a rectangular pane of glass, and cut an opening of the required shape in metal sheets 30, which form the sides of a rectangular box forming the signal hand. If the light 29 carries a red bulb, the signal hands may be of clear glass, but I prefer to make them of red glass, and to use a white bulb. Celluloid may, of course, be used instead of glass, but, if used, it would be flimsy, unless supported by a metal casing. This light may be connected directly with a storage battery through wires 31, with a switch conveniently located to cut it off when not in use, or it may have one wire $31^a$ connected directly with the light as shown, and the other $31^b$ terminating in a contact 32, which engages a disk 33, which is fastened to the post 2, and rotates with same, (see Fig. 6) and from which disk a wire $31^c$ leads to the light. The disk 33 should, of course, be insulated from the post 2, and the contact 32 from the case 4, though such insulation is so common as not to need description, and is not shown in Figs. 5 and 6, but is shown in the modification Fig. 8. With this arrangement, if desired, the light may be left connected at all times if it is desired, since it only operates when the signal is being used. 34 is a disk essentially a pair of lever arms, fastened on the shaft 2, (see Fig. 7) and connected by flexible links or cords 35 with a tension spring 36, which disk and spring hold the signal hand in its normal or neutral position.

Attention is called to the fact that the cam 27, and lever arms 22 and 26 in all the views are shown in the position which they take when the steering wheel is rotated one half turn, and that the dotted position of the cam $27^x$ and $22^x$ and $26^x$ of the lever arms is the normal position when the car is moving straight ahead.

The action of the device is as follows: The signal hand 1 is set in normal or neutral position, with its axis parallel with the longitudinal axis of the car, originally by pulling the cord 21 until the plungers $10^r$, $10^l$, are both retracted and held by the latches $14^r$, $14^l$, when the operating mechanism will be in the position shown in the plan view Fig. 4. If now, the car be approaching a corner, and it is desired to turn to the right, the button on the right hand side of the steering wheel (neither button is shown) is pressed and the circuit closed in the pair of wires $20^r$. This charges the electromagnets $19^r$, and attracts the auxiliary latch $16^r$, thus releasing the main latch $14^r$, and the latch rod $10^r$. This rod is thrown forward by the actuating spring $11^r$, and after closing the slight gap between it and the guide rod $8^r$, it moves it forward in the guide $9^r$, and through the connecting rod $7^r$ rotates the oscillating member 5 to the right, and with it the post 2 and signal hand 1 until the signal hand points to the right and is at right angles to its normal position, and to the axis of the car, at which time the shoulder on the connecting rod $7^r$ comes against a stop 37, which is a part of the case 4. It will be noted that in rotating the disk 5 to the right (or left) the opposite connecting rod $7^l$ (or $7^r$ and guide rods $8^l$ (or $8^r$) must move backward slightly. This, I provide for by leaving the gap or clearance shown between the ends of these guide rods $8^r$, $8^l$ and the latch rods $10^r$, $10^l$. The signal hand having been released and rotated to its warning position, remains in that position as long as the car continues straight ahead, or, until the turn is actually reached. At this time it is necessary to rotate the steering wheel to make the turn; when this is done, the cam 27 is rotated and forces the arm 26, and with it the arm 22 to one side, thus pulling on the cords $21^r$, $21^l$, and through them retracting the latch rod $10^r$, which had been released and resetting it and the actuating springs, the latches dropping into place as soon as the rod is sufficiently retracted. The signal hand is returned to normal position by the tension spring 36 acting through the disk 35 and the shaft 2. It will be especially noted that the retracting mechanism acts on either latch rod that has been released, or on both, should it so happen that both should be released at once, and that rotating the wheel either to the right or left will have the same effect, so that in case of error in setting the signal hand, the turn, though made in the opposite direction will reset it.

In Figs. 8 to 12 inclusive, I show modified forms of my device in which $1^m$ is the signal hand which is carried by a post $2^m$ adapted to rotate in bearings $3^m$ in the case $4^m$. The hand $1^m$ is preferably painted red and illuminated at night by two light bulbs $30^m$ which may be red bulbs, or shine through red glass windows 38 in the cover case 39.

The light wires $31^m$ are shown extending up the center of the post $2^m$, which is hollow and with a contact 32, and disk 33 for switching the light on and off. The signal hand $1^m$ is rotated to warning position right or left, by means of an oscillating member or disk 40, attached to the post $2^m$, to the right and left hand sides of which member the two actuating springs $41^r$, $41^l$, are attached. These springs, which in this modification are tension springs, are attached at their opposite ends to latch rods 42ʳ, 42ˡ, which are held retracted by latches 43ʳ, 43ˡ, which in turn are tripped by electromagnets 44ʳ, 44ˡ, actuated by open circuit wires 45ʳ, 45ˡ leading to a battery and to push buttons (not shown) on the right and left hand sides of the steering wheel. The latch rods are retracted by cords 21ʳ, 21ˡ, as previously described, thus setting the actuating springs. The latching mechanism shown in Figs. 4 and 5 can be used instead of that here shown, or the modified form of latching and releasing device here shown can be used with the plungers 10ˡ, 10ʳ, of Figs. 4 and 5.

Figure 12:
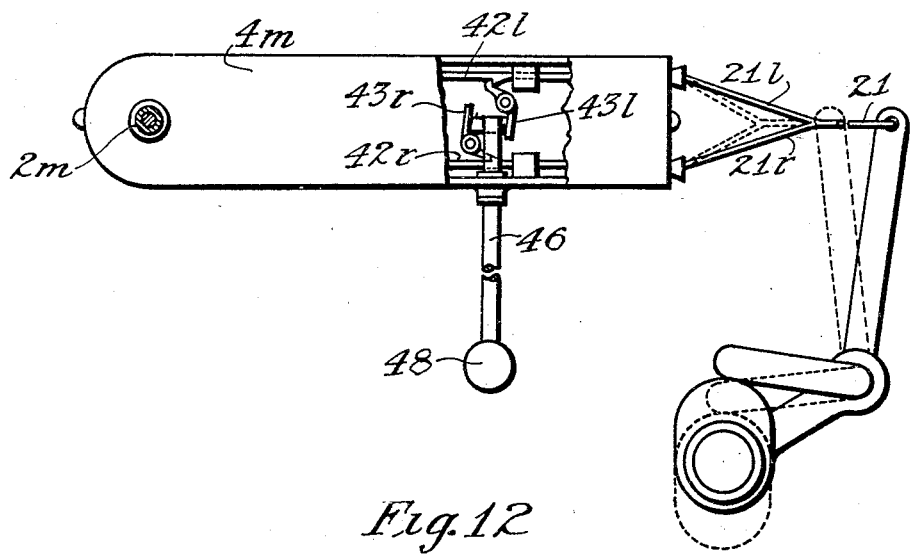
Fig. 12 is a plan view partially sectional to illustrate the same device.

In Figs. 11 and 12, I show a mechanical form of trip operating device in lieu of the electromagnet. In this form a rod 46 is extended into the case 4ᵐ, and has a lever arm 47 fastened to it. This arm normally comes between the latches 43ʳ, 43ˡ, and if the rod be swung in either direction, will trip one of the latches. The rod 46 may be extended back along the side of the automobile and terminate in a lever 48. When this lever 48 is pulled to the right, it will trip the right hand latch 43ʳ, and when pushed to the left, the left hand latch 43ˡ, releasing respectively the latch rods 42ʳ and 42ˡ, and the corresponding actuating springs.

The operation of the modified form of the device is as follows: The right hand button on the steering wheel having been pushed, the latch 43ʳ releases the latch rod 42ʳ and the tension on the actuating spring 41ʳ. The actuating spring 41ˡ being still under tension rotates the signal hand to the right until the lug 49 on the oscillating member 40 comes against the stop 50. Turning the steering wheel to take the corner, restores the signal hand to its normal position as before described, and resets the actuating springs.

The case 4 may, if desired, be turned on one side, so that the shaft 2 will be in a horizontal position, and the hand 1 be attached to the shaft, with the plane of the hand at right angles to same, and pointing either upward or downward, preferably downward. The actuating mechanism may then be operated as hereinbefore described to oscillate the hand to a horizontal position either to right or left, as may be desired. It will, of course, be necessary only to switch the operating buttons from one side of the steering wheel to the other to provide for the hand pointing upward or downward in order that the right and left hand button may operate same in the desired direction.

Having fully described my invention, what I claim and desire to secure by Letters Patent in the United States is:—

1. In an automobile warning signal, the combination with a case adapted to be attached to the body of an automobile, a post rotatably mounted in said case, a signal hand attached to said post above said case, an oscillating member attached to said post, a pair of opposed actuating springs under strain to oscillate said member in opposite directions, a latch holding each of said springs under strain, electromagnets each adapted to actuate one of said latches, individual circuits leading from said electromagnets to opposite sides of the steering wheel, and switches in each of said circuits to release said latches, of means of resetting said actuating springs when the steering wheel is rotated in either direction.

2. In an automobile warning signal, the combination with a case adapted to be attached to the body of an automobile, a post rotatably mounted in said case, a signal hand attached to said post above said case, an oscillating member attached to said post, a pair of opposed actuating springs under strain to oscillate said wheel in opposite directions, a latch holding each of said springs under strain, electromagnets each adapted to actuate one of said latches, individual circuits leading from said electromagnets to opposite sides of the steering wheel, and switches in each of said circuits to release said latches, of a cam mounted on and rotating with the steering post, a bell crank lever system actuated by said cam, and a flexible connector from the lever system to the actuating springs, to reset same under strain when the steering wheel is rotated in either direction.

In testimony whereof I have hereunto set my name.

GEORGE L. HARRIS.

Witnesses:
 D. C. MILLER,
 C. L. PASHBY.

Copies of this patent may be obtained for five cents each, by addressing the "Commissioner of Patents, Washington, D. C."